April 30, 1963  C. E. KRAMPF ETAL  3,087,229
CAPACITOR ASSEMBLY MACHINE
Filed Jan. 18, 1955  10 Sheets-Sheet 2

INVENTORS
Charles E. Krampf
James H. Luther
BY
Dean Fairbank + Hirsch
ATTORNEYS April 30, 1963 C. E. KRAMPF ETAL 3,087,229
CAPACITOR ASSEMBLY MACHINE
Filed Jan. 18, 1955 10 Sheets-Sheet 8

INVENTORS
Charles E. Krampf
James H. Luther
BY
Dean Fairbank & Hirsch
ATTORNEYS

April 30, 1963

C. E. KRAMPF ETAL 3,087,229

CAPACITOR ASSEMBLY MACHINE

Filed Jan. 18, 1955

INVENTORS
Charles E. Krampf
James H. Luther
BY
Dean Fairbank & Hirsch
ATTORNEYS

United States Patent Office 3,087,229
Patented Apr. 30, 1963

3,087,229
CAPACITOR ASSEMBLY MACHINE
Charles E. Krampf, New Bedford, Mass., and James H. Luther, Allegany, N.Y., assignors to Aerovox Corporation, New Bedford, Mass., a corporation of Massachusetts
Filed Jan. 18, 1955, Ser. No. 482,548
23 Claims. (Cl. 29—25.42)

This invention relates to the art of machines for assembling electrical units, more particularly of the type to assemble disc type units such as capacitors.

As conducive to an understanding of the invention, it is noted that where electrical units such as for example capacitors of the type comprising a disc of dielectric material having a conductive coating on opposed surfaces, have the terminal leads manually soldered to such coatings; the assembly operation is time-consuming and requires much personnel with resultant high cost of production and consequent high cost of the finished product.

It is accordingly among the objects of the invention to provide an equipment which is relatively simple in construction and is capable of long continuous operation without likelihood of becoming deranged and which, at a relatively high rate of speed, will perform the various operations for assembly of terminal leads to disc capacitors by dependably and securely soldering said leads to the respective conductive coatings on the two faces of the disc capacitor without need for manual operation of any sort, with high output and relatively low cost per unit of capacitor completely fabricated by the conclusion of an automatic manufacturing cycle through which the disc is passed.

Another object is to provide a tape which securely mounts a plurality of electrical units distributed therealong for advancing said units through successive stations in the assembly cycle.

Another object is to provide a tape of the character referred to which maintains the assembled capacitors securely in place and admits of ready removal therefrom of successive capacitors, for individual packaging, installation and may also serve in the further processing of such units as for instance stamping, testing, waxing and the like.

According to the invention, an elongated tape has mounted thereon a plurality of pairs of terminal leads, the ends of each pair protruding beyond a longitudinal edge of the tape and mounting an electrical unit such as a capacitor disc.

More specifically, the tape comprises a pair of superimposed strips of suitable material such as paper between which the pairs of terminal leads are lodged, the strips being preferably stitched together, releasably to retain the leads in position.

The leads are formed by weaving a wire substantially sinusoidally between the paper strips with successive reversely bent loops thereof extending beyond opposite longitudinal edges of the tape. Thereupon in the illustrative embodiment shown the reversely bent loops of wire at one edge of the tape are severed at one station in the movement of the tape, so that they may be crossed over and spaced from each other and a capacitor disc is inserted in the next station between the severed crossed over ends, which engage the conductive coatings or electrodes of the disc and securely grip the disc therebetween. The tape with the discs thus mounted thereon is advanced to the next station successively to apply suitable flux and solder illustratively by dipping into tanks, for secure connection of such leads to the disc. The reversely bent wire loop at the other edge of the tape is severed at the following station and the disc and portions of the leads affixed thereto are insulation coated at a subsequent station in suitable manner to form the finished product.

In the accompanying drawings in which are shown one or more of various possible embodiments of the several features of the invention, FIGS. 1 and 2 combined show a top plan view of the tape forming and disc insertion portion of the equipment, FIG. 3 is a detail view on a greatly enlarged scale of the lead spreading mechanism, FIG. 4 is a side elevational view of the lead spreading mechanism of FIG. 3, FIG. 8 is a fragmentary side elevational view of the tape forming portion of the equipment.

Referring now to the drawings, as is clearly shown in FIGS. 1, 7, 8 and 19, the equipment comprises a pair of spaced parallel standards 21 and 22 rising from a table 23 and each of which has a bearing 24 at its upper end. Rotatably mounted in the aligned bearings 24 is a transverse shaft 25 to which is affixed a pair of spaced sprocket wheels 26.

A second pair of spaced parallel standards 27 and 28 (FIGS. 2 and 9) are affixed to the table 23 longitudinally aligned respectively with the standards 21 and 22. Each of the standards 27 and 28 also has a bearing 29 at its upper end as well as a bearing (not shown) below bearings 29 and transverse shafts 32 and 33 extend through said respective pairs of bearings. Affixed to the shaft 32 is a pair of spaced sprocket wheels 34 aligned respectively with the sprocket wheels 26 on shafts 25.

Figure 1:
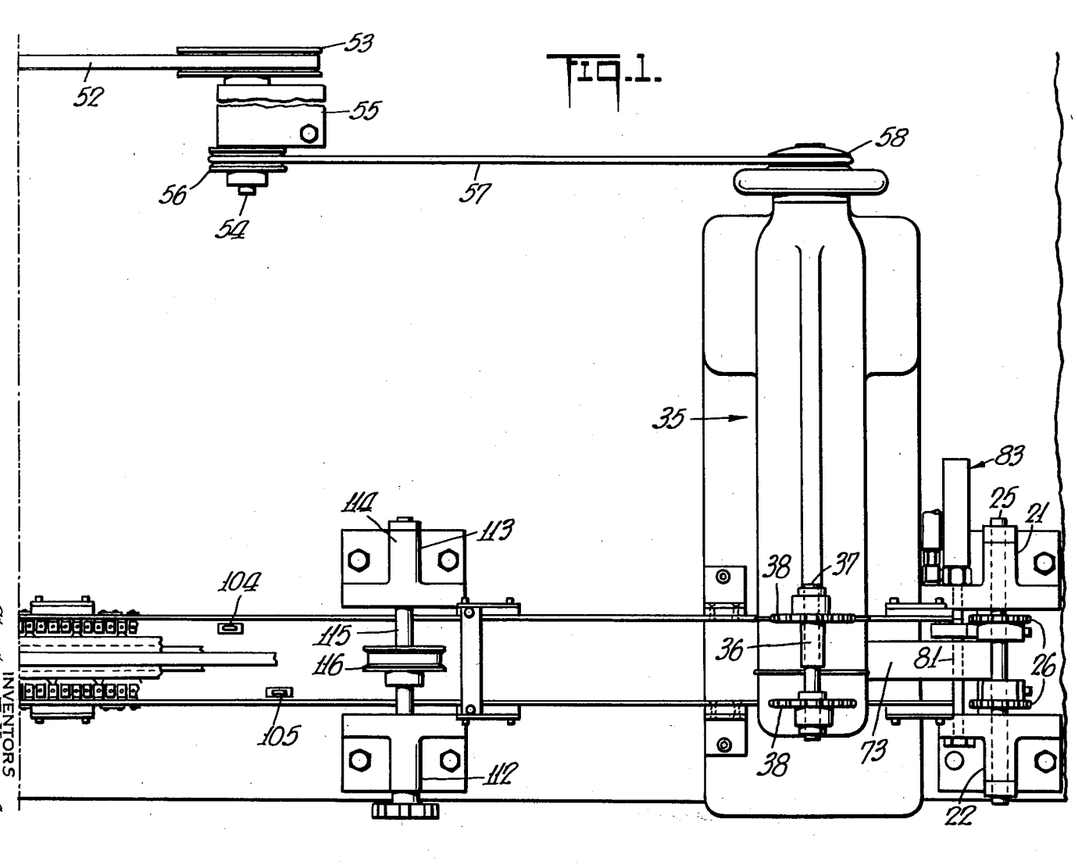
Figures 5, 6, 7, 14, 15:
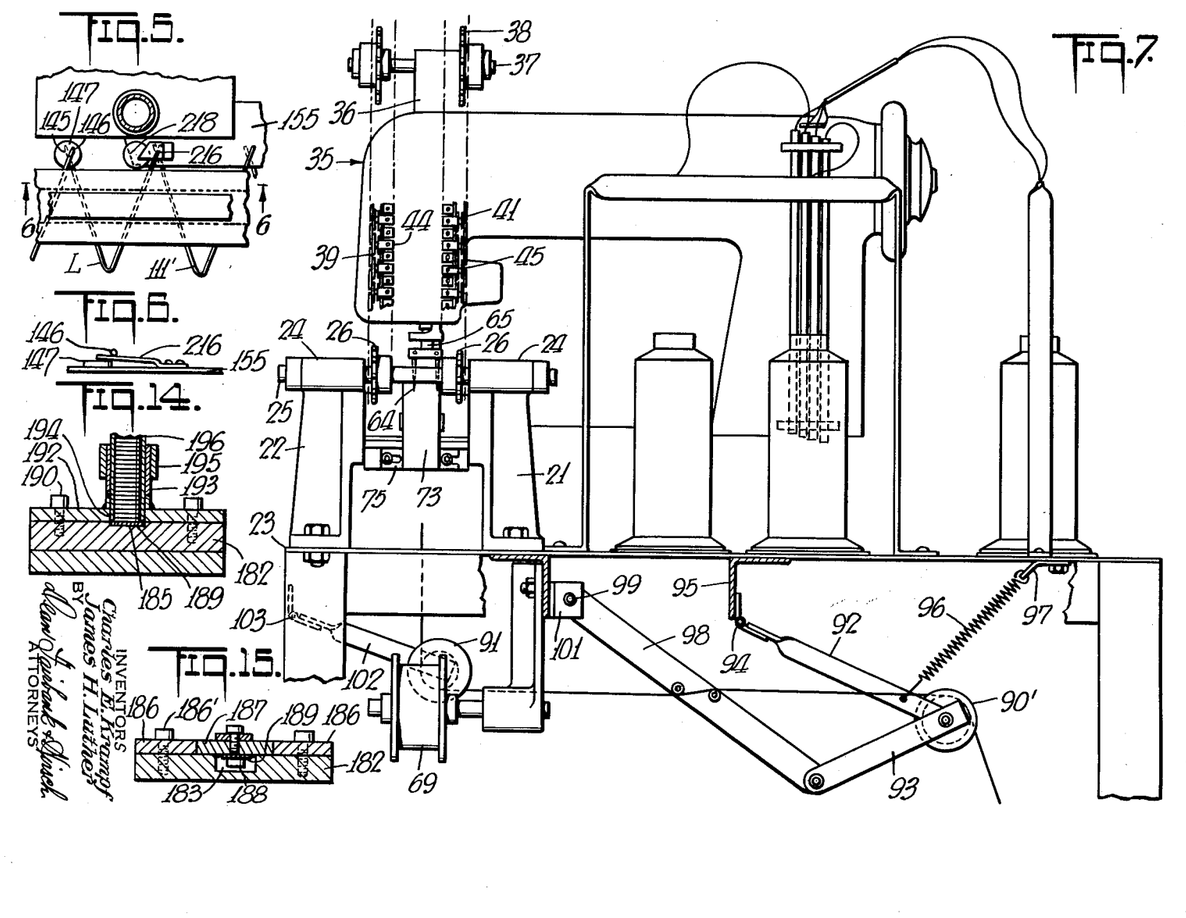
FIG. 5 is a detail view on a greatly enlarged scale of the disc insertion mechanism.
FIG. 6 is a side elevational view taken along line 6—6 of FIG. 5.
FIG. 7 is an end elevational view of the tape forming portion of the equipment.
FIG. 14 is a sectional view taken along line 14—14 of FIG. 10.
FIG. 15 is a view similar to FIG. 14 taken along line 15—15 of FIG. 10.

Positioned between the pairs of standards 21, 22 and 27, 28 and extending transversely across the table adjacent the standards 21, 22 is a sewing machine 35 which may be of conventional type such as a Singer sewing machine Model 300W–201. Affixed to the top of the sewing machine, as shown in FIGS. 1 and 7, is a block 36 in which a shaft 37 is rotatably mounted. The shaft 37 mounts a pair of sprocket wheels 38 which are longitudinally aligned respectively with the sprocket wheels 26 and 34 on shafts 25 and 32.

Each of the longitudinally aligned sets of sprocket wheels 26, 34 and 38 is encompassed by an associated sprocket chain 39, 41 respectively. As is clearly shown in FIG. 19 the side plates 43 and 43' of each of the links of the chain are retained together by connecting rivets 42 and the inner plate 43' has an inwardly extending arm 44.

Figures 18, 19, 20, 21:
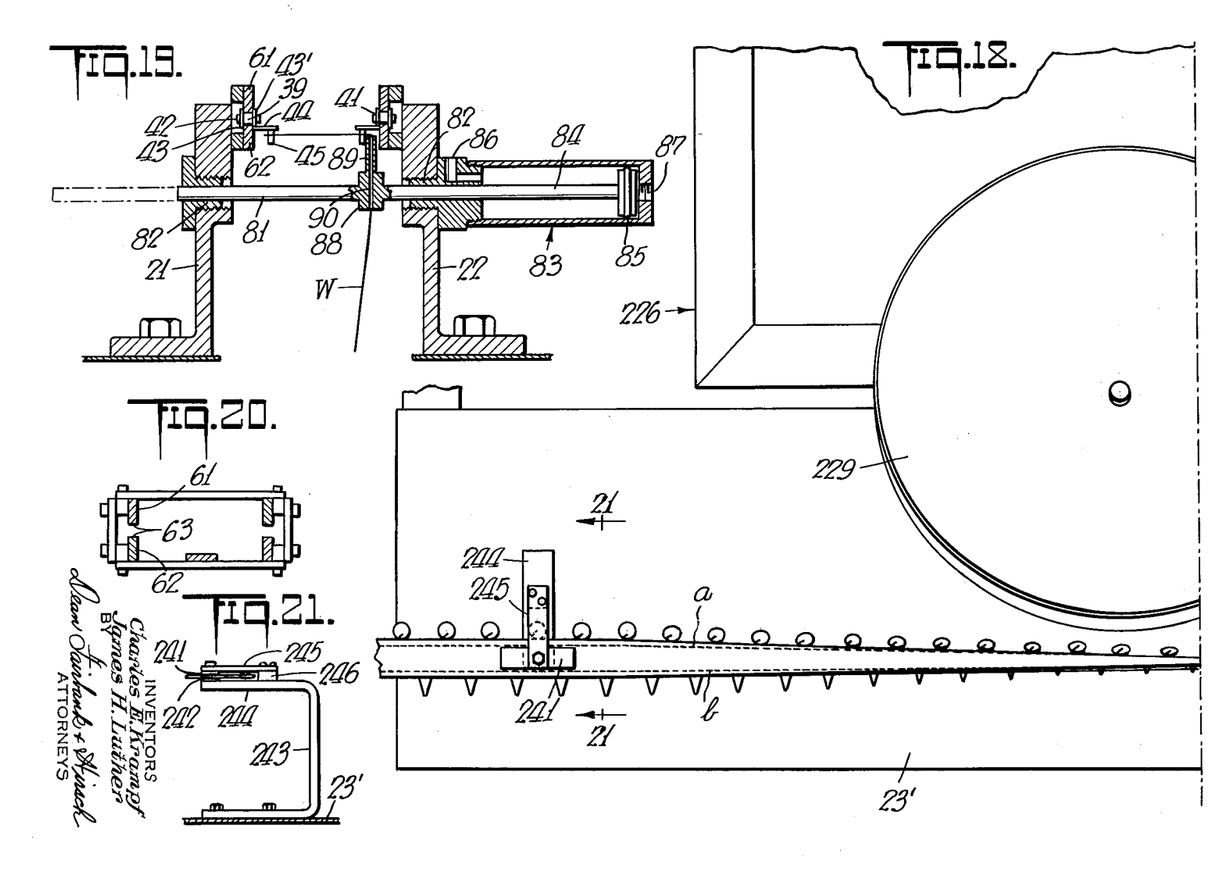
FIG. 18 is a view similar to FIG. 16 of another portion of the dipping mechanism.
FIG. 19 is a sectional view taken along line 19—19 of FIG. 8.
FIG. 20 is a view similar to FIG. 19 taken along line 20—20 of FIG. 8.
FIG. 21 is a sectional view taken along line 21—21 of FIG. 18, FIGS. 22 and 23 combined show a side elevational view of the tape advancing mechanism, the disc positioning mechanism and the tape severing mechanism.

As is clearly shown in FIGS. 7 and 19, a plurality of pins 45 are equally spaced along each of the sprocket chains and are affixed to and depend from the arms 44. The pins 45 on the respective sprocket chains 39 and 41 are staggered with respect to each other and serve as the forming members for the capacitor leads in the manner hereinafter described.

Figures 2, 3, 4:
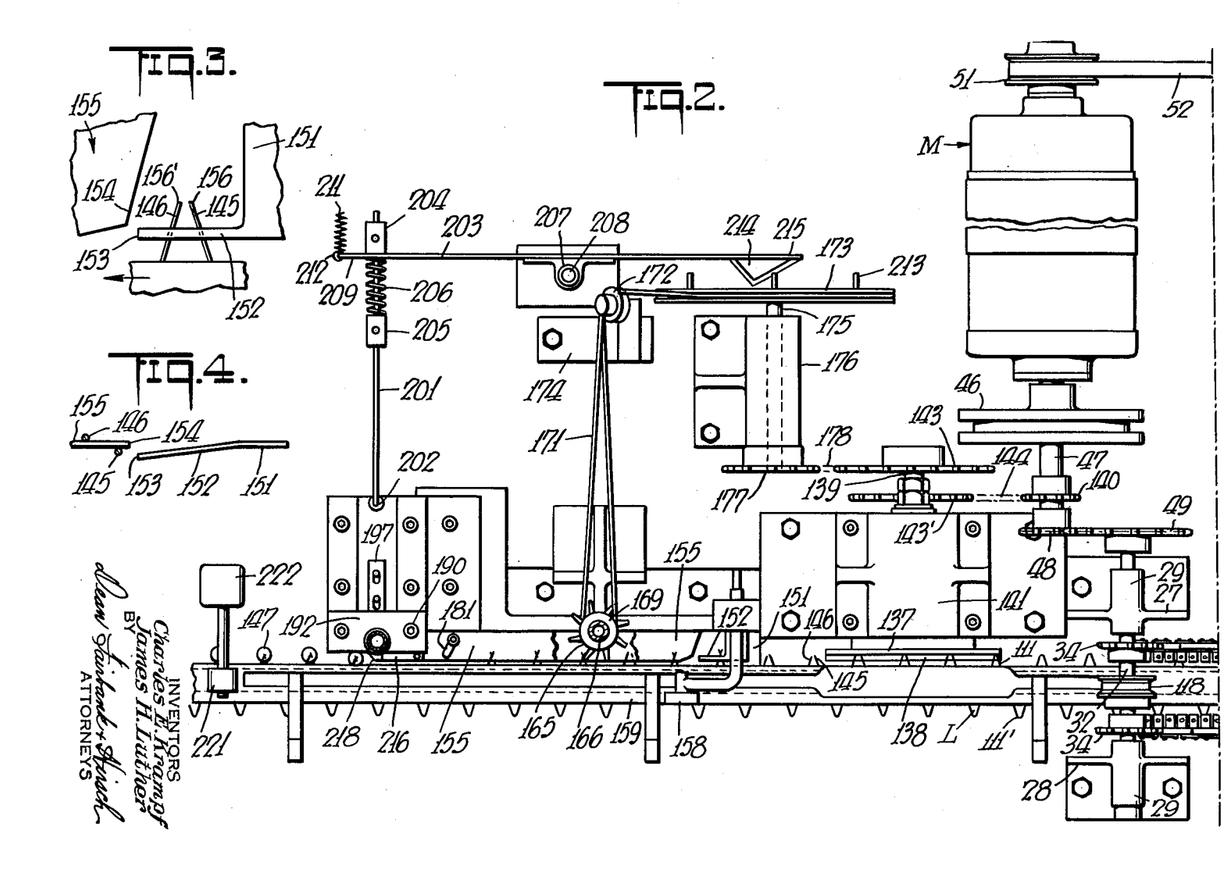

Although the sprocket chains 39, 41 may be driven in any suitable manner, a drive motor M, as shown in FIG. 2, may be provided for the purpose, the shaft of which through a clutch 46 and shaft 47 drives a sprocket wheel 48. The sprocket wheel 48 drives a sprocket wheel 49 affixed on the end of transverse shaft 32 so that upon rotation of said sprocket wheel 49 through the transmission previously described from motor M, the sprocket chains 39 and 41 will be rotated in the desired direction.

The motor M may also serve to provide the power for operating the sewing machine 35. To this end, as shown in FIGS. 1 and 2, the shaft of motor M has affixed thereto a pulley 51 connected by a belt 52 to a pulley 53 on a shaft 54. The shaft 54 is suitably mounted in a bearing 55 affixed to the table 23 and mounts a pulley 56 at its other end which is connected by belt 57 to a pulley 58 on the main drive shaft of the sewing machine.

Means are provided to prevent excessive vibration of the sprocket chains 39 and 41 which might cause dislodgment of the terminal wire carried thereby as hereinafter described. To this end, as is clearly shown in FIG. 19, a pair of spaced guide strips 61 and 62 are associated with each of the sprocket chains 39, 41 along the horizontal runs thereof between sprocket wheels 26 and 34 respectively. Each of the pairs of supporting strips are vertically aligned as shown so as to straddle the associated sprocket chain and the adjacent edges 63 (FIG. 20) of the strips 61, 62 are positioned between the side plates 43 and 43' of each of the links of the sprocket chains, thereby to prevent transverse and vertical displacement thereof, sufficient clearance being provided for free movement of said sprocket chains.

As is clearly shown in FIGS. 7 and 8, a pair of needles 64 are mounted on the vertical shaft 65 of the sewing machine 35 and are movable between the sprocket chains 39 and 41, the needles being transversely aligned with the path of movement of said sprocket chains. Means are provided to feed a pair of continuous lengths of strips, preferably of paper, past the needles 64 and between the conventional presser foot 66 and presser plate 67 of the sewing machine for stitching of such strips together. To this end, as is clearly shown in FIG. 8, the strips S and S' are fed from suitable supply rolls (not shown) around a pair of paper feed rollers 68 and 69 respectively, mounted on suitable brackets 71 affixed to the undersurface of the table 23. The strip S' extends through an opening 72 in the table over and around a guide member 73. The guide member 73 is affixed at one end as at 74 to a block 75 (FIG. 8) supported between the upright standards 21 and 22 and has its leading edge 76 positioned to the right of the needles 64 between the two parallel runs of the sprocket chains 39 and 41.

The strip S extends along beneath the table 23 and then passes around the curved lower end 77 of a vertical guide strip 78 between sprocket chains 39 and 41, the leading edge 79 of which is in front of the leading edge 76 of the guide strip 73, also to the right of the needles 64.

Means are provided to position a continuous length of conducting wire in a sinusoidal course between the two strips S and S', with the reversely bent loops of the sinusoidal wire protruding alternately from opposite edges of the strips. Such means, as is clearly shown in FIGS. 1 and 19, may comprise a reciprocable rod 81 slidably mounted in suitable bearings 82 in the standards 21 and 22 beneath the horizontal run of the sprocket chains 39 and 41 and slightly to the left of the sprocket wheels 26. Although the rod 81 may be reciprocated in any suitable manner, such as by an electric solenoid, in a preferred embodiment shown, an air cylinder 83 is shown for this purpose controlled by micro-switches 104, 105 (FIG. 1) which are actuated by the pins 45 on the sprocket chains. As more particularly shown in FIG. 19, the end 84 of the rod is positioned in cylinder 83 and mounts a piston 85. The cylinder has air inlets 86 and 87 respectively, near its opposite ends so that when air is alternately fed under pressure, through each of such inlets, the piston 85 and piston rod 81 connected thereto are reciprocated.

Affixed to rod 81 is a guide member 88 which has a vertical sleeve 89 rising therefrom adapted to fit readily between the guide strip 62 and the depending pin 45 carried by the sprocket chains 39 and 41 respectively.

Extending through a bore 90 in the guide member 88 and through the sleeve 89 is a wire W which is supplied from a spool (not shown). As is clearly shown in FIG. 7, the wire W extends around a spring urged roller 90' and a second roller 91 so that the wire will be maintained under tension. The roller 90' is rotatably mounted on the ends of a pivoted arm 92 and a link 93. The arm 92 is pivoted at one end as at 94 to a bracket 95 affixed to the undersurface of the table 23 and is urged in a counterclockwise direction by means of a coil spring 96 affixed at one end to the arm 92 adjacent the roller 90' and at its other end to the table as at 97. The link 93 is pivoted at its free end to the end of an arm 98 pivoted as at 99 to a bracket 101 affixed to the table. The roller 91 is rotatably mounted at the end of an arm 102 pivotally mounted as at 103 to the table 23.

With the equipment thus far described, as more fully set forth hereinafter, the wire W will be wound around alternate pins 45 carried by the sprocket chains 39, 41 and the sinusoidal arrangement of wire thus formed will be positioned between the two paper strips S and S' which thereupon will be stitched together by the sewing machine needles 64 which will form two parallel runs of stitching extending longitudinally of the tapes and securely retaining the sinusoidal loops of the wire therebetween.

Means are provided to strip the reversely bent ends 111, 111' of the loops L formed from the wire W, from the pins 45 carried by the sprocket chains 39 and 41.

Such means, as is clearly shown in FIGS. 1 and 8, may comprise a pair of standards 112 and 113 on the table 23 rotatably mounting a shaft 115 in bearings 114 at their upper ends. Affixed to the shaft 115 midway between the runs of the sprocket chains 39 and 41 is a pulley 116 which is connected by means of a V-belt 117 to vertically aligned pulleys 118, 119 (FIGS. 8 and 9) affixed on the shafts 32 and 33 respectively. The belt 117 is maintained under tension by means of a roller 121 rotatably mounted at the end of an arm 122 which has a lateral extension 123 protruding through a bore in a block 124 affixed to the table 23. The arm 122 may be adjusted by means of a plurality of set screws 125, so that the roller 121 exerts the desired tension against the belt 117.

Thus, when the connected strips S and S' which form a tape reach the roller 116 (FIG. 8) the tape will pass beneath the lower run 126 of the V-belt and as the latter run is at a downward incline, the reversely bent loops 111, 111' of the wire will become stripped from the pins 45 carried by the horizontal runs of the sprocket chains 39 and 41, the loops 111 and 111' extending laterally beyond the respective longitudinal edges of the tape.

When the loops 111, 111' of the wire are stripped from the pins 45 they will tend to bend and means are provided to straighten such ends. As illustratively shown in FIGS. 9 and 13, such means may comprise a pair of L-shaped arms 131, one leg 132 of each of which is mounted in block 124 and the other leg 133 of which extends at substantially right angles to arm 132, said legs 133 being aligned with the loops 111, 111' respectively of the wire. Thus, as the tape advances, the loops 111, 111' will ride on arms 133 to be bent upwardly to desired position.

Figures 9, 10:
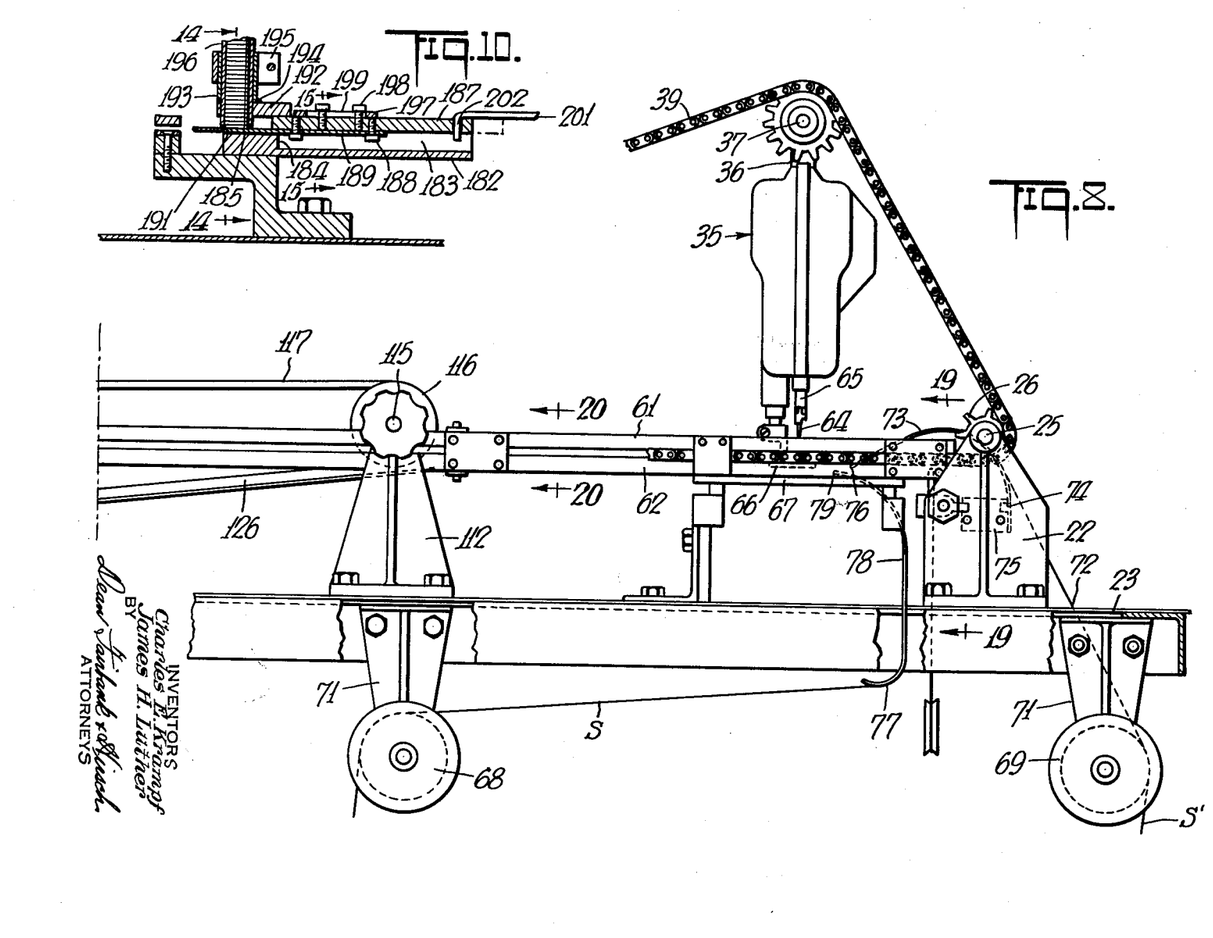
FIG. 9 is a view similar to FIG. 8 of the disc insertion portion of the equipment.
FIG. 10 is a sectional view taken along line 10—10 of FIG. 9.
Figure 9:
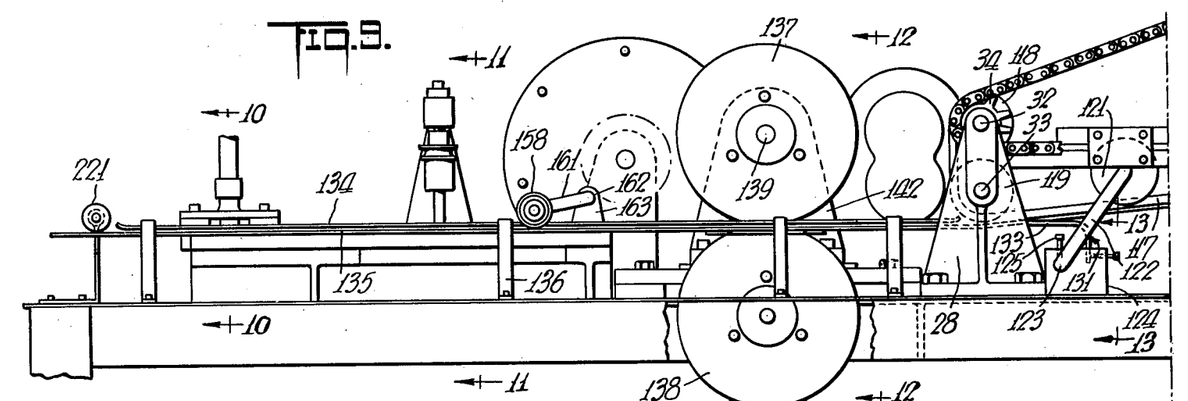

A pair of spaced, elongated strips 134 and 135 extending longitudinally along the machine, and supported in any suitable manner as illustrated by the brackets or mounts 136, serve to guide the tape length beyond the roller 119 shown in FIGS. 9 and 14.

Figure 12:
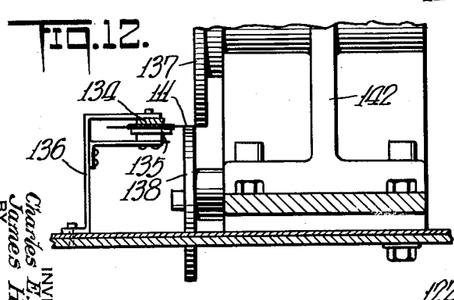
FIG. 12 is a view similar to FIG. 11 taken along line 12—12 of FIG. 9.

Means are provided at the next station of the equipment successively to sever the loops 111 at one edge of the tape. To this end, as shown in FIGS. 9 and 12, a pair of cutting wheels 137 and 138 are provided positioned on one side of the length of tape and adapted to engage and sever the reversely bent loop 111 at such edge. As is clearly shown in FIGS. 2 and 9, the cutting wheel 137 is mounted on the end of a shaft 139 rotatably mounted in a suitable bearing 141 at the upper end of a standard 142 affixed to the table 23. The cutting wheel 138 is similarly mounted beneath the table 23. The cutting wheels 137 and 138 are rotated in a clockwise and counterclockwise direction respectively by the main drive motor M through a transmission including the sprocket wheels 140, 143 and 143' and the sprocket chain 144.

Means are provided to prepare the leads 145, 146 (FIG. 2) formed by the severing of the loop 111 to receive a capacitor wafer 147, illustratively a disc of dielectric material such as ceramic which has an electrode, desirably a suitable conductive coating such as silver on each face.

To this end, as is clearly shown in FIGS. 2 to 4, a bracket 151 is provided having a relatively thin finger 152 inclined downwardly as shown, and extending parallel to the path of movement of the tape so that it will be positioned over the leads 145 and 146. The free end 153 of the finger 152 is spaced slightly from the edge 154 of a separator plate 155, the edge 154 being beveled at an angle more or less corresponding to the angle of inclination of the forward lead 146. Thus, as the tape is advanced in the manner hereinafter to be described, when the forward lead 146 reaches the end 153 of the finger 152, since the leads are placed under tension as by the inclined finger 152, such forward lead will snap upwardly over the edge 154 of the separator plate 155 which lies in a plane slightly below the plane of the leads. As the lead 145 reaches the end of the finger 152, the upper end 156 of such lead will be moved under the edge 154 and hence the leads 145 and 146 will be positioned respectively on opposed sides of such separator plate as is clearly shown in FIG. 4.

To prevent transverse slippage of the leads 145, 146 through the tape when they are separated as above described, a roller 158 (FIGS. 2 and 9) is provided which rides on the edge 159 of the tape pressing the latter against the guide strip 135 therebelow. The roller 158 is mounted at the end of an L-shaped arm 161, the horizontal arm 162 of which is pivotally mounted in a bracket 163 affixed to the table 23. The roller is thus retained by the force of gravity against the tape and against the wire therein. If desired, resilient means (not shown) may be associated with the arm more firmly to retain the roller against the tape.

Figure 11:
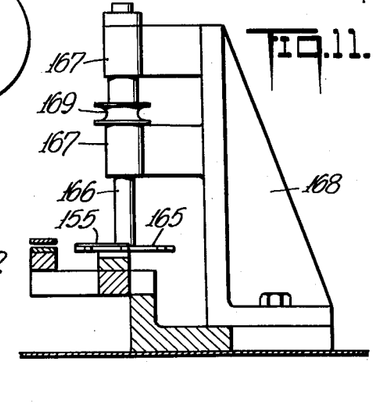
FIG. 11 is a sectional view taken along line 11—11 of FIG. 9.

The leads 145 and 146 when they initially are positioned on opposed sides of the separator plate 155 have their free ends 156, 156' spaced from each other as shown. Means are provided to move the free ends of the leads toward each other so they cross over. Such means may comprise a star wheel 165 (FIGS. 2 and 11) affixed to a vertical shaft 166 rotatably mounted in a bearing 167 formed in a standard 168 affixed to the table 23. The star wheel 165 is so positioned that the teeth thereof, when the wheel is rotated in a clockwise direction, will engage and bend to the left the lead 145 positioned beneath the separator plate 155.

Although the star wheel 165 may be rotated in any suitable manner, in the illustrative embodiment herein shown a pulley 169 affixed to shaft 166 is connected by belt 171 to an inclined pulley 172 and a driving pulley 173. The inclined pulley 172 is mounted on a standard 174 affixed to the table 23 and the pulley 173, which is positioned in a vertical plane, as shown, is mounted on one end of a shaft 175 extending through a suitable bearing in a bracket 176 affixed to the table 23. The other end of shaft 175 mounts a sprocket wheel 177 which is operatively connected by means of a sprocket chain 178 to the sprocket wheel 143 driven from the main drive motor M.

In order to bend the forward lead 146 to effect the desired cross over of the two leads 145, 146, an arm 181 (FIG. 2) is affixed to the separator plate 155 and its free end extends in the path of movement of such forward lead 146 which, after engaging the arm 181, will thereby be bent to the desired position.

Disc injection mechanism shown in FIGS. 2, 5, 6, 9, 10, 14 and 15 serves to insert a disc 147 between the successive pairs of spaced leads 145 and 146.

This mechanism desirably comprises a substantially rectangular block 182 affixed to the table 23 and spaced therefrom. The block 182 has an elongated rectangular groove 183 therein which extends at right angles to the path of movement of the tape. As is clearly shown in FIG. 10, the groove ends at its inner end 184 and a relatively shallow elongated groove 185 is aligned with and extends beyond the elongated groove 183.

Affixed to the block 182 and extending parallel to the aligned grooves 183 and 185 are spaced guide strips 186 (FIG. 15) which are affixed as by screws 186' to the block. The spacing between the guide strips 186 is greater than the width of the grooves and a slidable member 187, illustratively a rectangular bar, is positioned on the block between the guide strips so as to rest over the groove 183. Affixed to the undersurface of the slide bar 187 as by screws 188, which are aligned with the groove 183, is a relatively thin pusher strip 189, the outer end 191 of which rests in the shallow groove 185.

Extending transversely across the block 182 and affixed thereto as by screws 190 is a strip 192 which supports the hopper containing the discs 147. As is clearly shown in FIG. 14, the hopper comprises a sleeve 193 affixed at its lower end as by welding to the top surface of the transverse strip 192 and having its bore aligned with an opening 194 in said transverse strip, said opening being vertically positioned over the relatively shallow groove 185 in the block 182. Mounted in such sleeve 193 so that its vertical position may be adjusted by means of a clamp 195 is a tube 196, which is normally set so that its lower end is but slightly spaced from the shallow groove 185 by a distance such that when a disc 147 is resting in the shallow groove 185, the disc immediately thereabove in the tube 196 will only partially protrude from the lower end of such tube, so that when the pusher strip 189 engages the edge of the disc in the shallow groove, only such disc will be advanced.

To limit the movement of the slide bar 187, a strip 197 (FIG. 10) is affixed thereto by screws 198, said screws extending through a longitudinal slot 199 in said strip so that the position of the latter may be adjusted. The strip thus will abut against the edge of the transverse strip 192 when the slider bar is moved forward to limit the movement of the slide bar 187.

Means are provided to actuate the slide bar in timed relation with the movement of the tape. To this end, a rod 201 (FIG. 2) is pivotally connected at one end as at 202 to the end of the slide bar 187 and extends at its other end through an opening in a lever 203. A collar 204 is affixed to the end of the rod 201 protruding beyond the lever 203 and a second collar 205 is affixed to the rod 201 on the other side of the lever and spaced therefrom. A stiff coil spring 206 encompasses the rod 201 between collar 205 and lever 203 to prevent jamming of the mechanism.

The lever 203 is pivotally mounted near its midpoint as at 207 on an upstanding pin 208 affixed to the table 23. The end 209 of the lever is normally urged in a clockwise direction by means of a coil spring 211 affixed at one end to the lever arm as at 212 and at its other end to the table 23. To pivot the lever 203 in timed relation with the movement of the tape, a plurality of projections or cam members 213 are mounted around the periphery of the pulley 173. These cam members are designed successively to engage an inclined cam plate 214 affixed to the free end 215 of the lever, so that the projections 213 of the pulley 173 successively engage the inclined cam plate 214, and move its free end in counterclockwise direction about pivot 208. By reason of the relative stiffness of the coil spring 206, when such movement is imparted to end 212, the rod 201 will be moved to cause the slide bar 187 to move forward for ejection of a disc 147 and when the projection 213 moves clear of the cam plate 214, the spring 211 will restore the lever to its original position.

In order that the disc may be pushed between the two leads 145, 146, means are provided to raise the leading lead 146. To this end, an inclined strip 216 (FIGS. 5 and 6) is affixed at one end to the separator plate 155 in such manner that as the leads 145, 146 are moved forward by the tape, the leading lead 146 will ride up the inclined strip 216 so that the disc 147 may be positioned beneath such strip and the lead 146 thereon. Thus, when the disc 147 is pushed forward by the pusher strip 189, it will move from the shallow groove 185 over the separator plate 155 directly between the leads 145, 146.

With further advance of the tape, the leads as well as the disc therebetween will clear the inclined strip 216 and the edge 218 of the separator plate 155 so that the two crossed leads 145, 146 will then press snugly against the opposed faces of the disc 147 and a three point suspension will be provided for the disc 147 which will securely retain it in position so that it may be advanced by the tape.

After the discs have thus been successively inserted between the leads, they are ready for the next step in the sequence of operations, that is, to have the leads soldered thereto.

Inasmuch as the tape is twisted in the manner hereinafter described for the soldering operation, means are provided to retain the tape in a horizontal plane while it is in position to receive discs in the manner described. To this end, table 23 at its left end (FIGS. 2 and 9) mounts a roller 221 on a suitable standard 222, which roller presses the tape against the strip 135 to retain the tape in a horizontal position. From the roller 221 the tape extends to a second table 23' (FIGS. 16 and 18) at which the leads and capacitor disc 147 are dipped into a suitable flux and thereupon dipped into solder to affix the leads to the opposed sides of the capacitor disc.

Figures 16, 17:
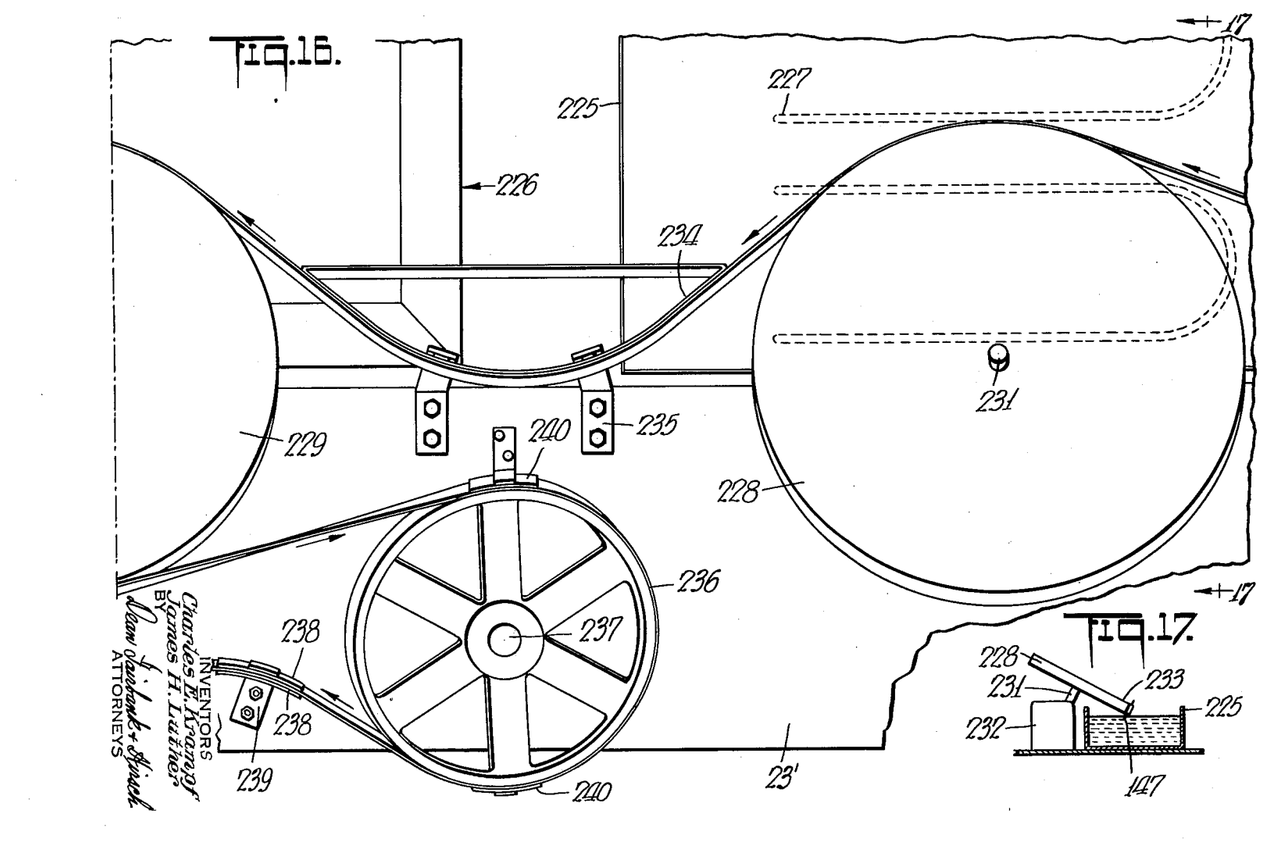
FIG. 16 is a fragmentary top plan view of one portion of the dipping mechanism.
FIG. 17 is a sectional view on a smaller scale taken along line 17—17 of FIG. 16.

Mounted on table 23' and longitudinally aligned thereon are tanks 225 and 226, the tank 225 being the flux tank and tank 226 being the solder tank. Suitable heating elements 227 in each of the tanks maintain the flux and solder at the desired temperature. Associated with each of the tanks are dipping rollers 228 and 229 each of which as is clearly shown in FIG. 17 is mounted at the end of an inclined shaft 231 supported on a standard 232 so that the rollers 228, 229 will also be maintained at an incline with their lower peripheries 233 inside the associated tank.

Positioned between the tanks 225 and 226 and the rollers 228 and 229 is a curved guide strip 234 mounted on brackets 235 affixed to the table 23'. The angle of inclination of the rollers 228, 229 and guide strip 234 is such that the tape guided thereby will be positioned with the discs depending therefrom. The level of the flux and solder in the respective tanks 225, 226 is such that only the portions of the capacitor discs having the leads 145, 146 in engagement therewith will be dipped into the flux and solder respectively, whereas the tape will not be dipped in such molten flux and solder.

Also positioned between the rollers 228 and 229 and aligned with the curved guide strip 234, is a roller 236 mounted on a shaft 237 supported on a standard (not shown) affixed to the table 23'. The shaft 237 is inclined in the opposite direction to the shafts 231 of rollers 228 and 229, and the tape encompasses such roller 236 and is passed between the spaced strips 238 of a guide member 239 which restores the tape to vertical position with the capacitor discs depending therefrom. As shown in FIG. 16, retaining strips 240 press the tape against the roller 236 to prevent displacement therefrom.

The tape, after it leaves the guide strips 238, is twisted so that it is again in horizontal position with the leads and capacitor discs extending laterally outward therefrom and the tape then passes between spaced guide strips 241 and 242 which are of width slightly less than the distance between the two lines of stitching a, b in the tape. The guide strips as shown in FIGS. 18 and 21 are mounted on a substantially U-shaped bracket 243 affixed to the table 23'. The lowermost guide strip 242 is affixed to the end of the topmost arm 244 of the bracket and the topmost guide strip 241, which is spaced from the strip 242, is mounted at the end of an arm 245 affixed to a block 246 mounted on the arm 244. Thus, as is shown in FIG. 21, the capacitor disc and leads will pass beneath arm 245 in the space between the guide strips 241, 242.

At this stage of the operation, the capacitor discs have been soldered to the wire leads and the tape in its advance brings the capacitors to the next station in the cycle.

After the tape with the capacitor discs and leads 145 and 146 affixed thereto leaves table 23', it is advanced to table 23'' where the reversely bent loop 111' is severed so that each of the capacitor units with its associated leads will form an individual unit.

Figures 22, 23:
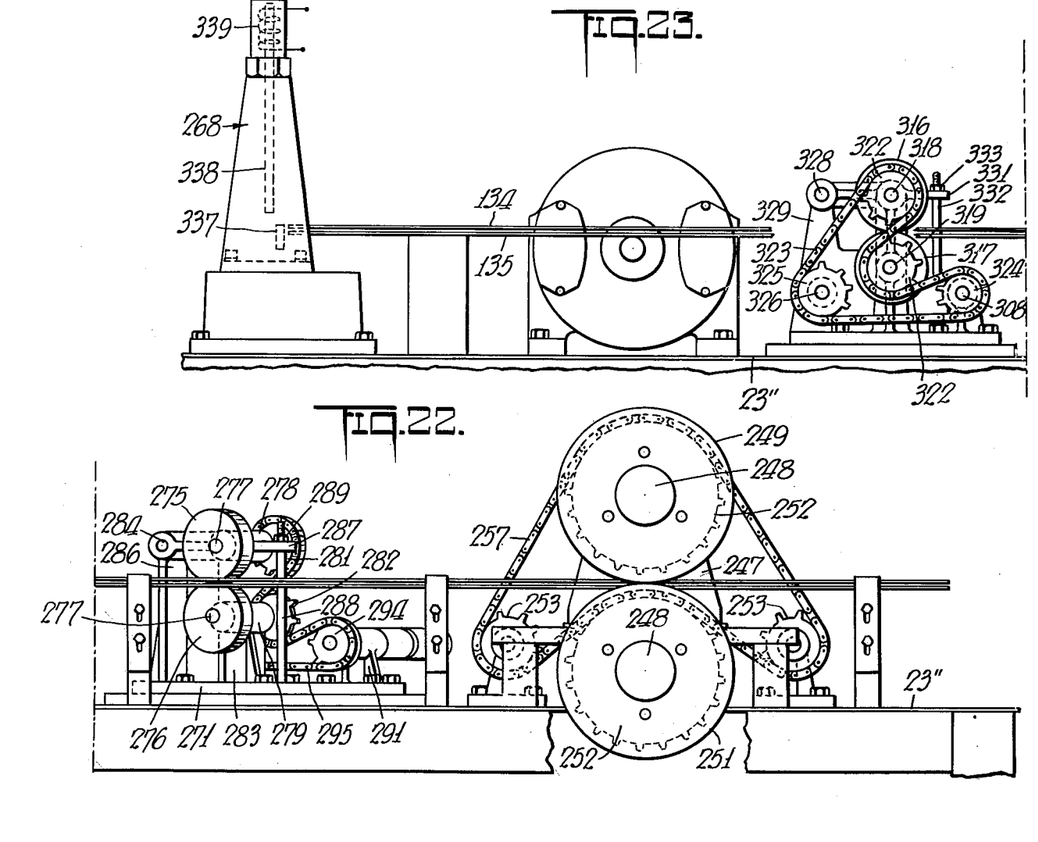
Figures 24, 25:
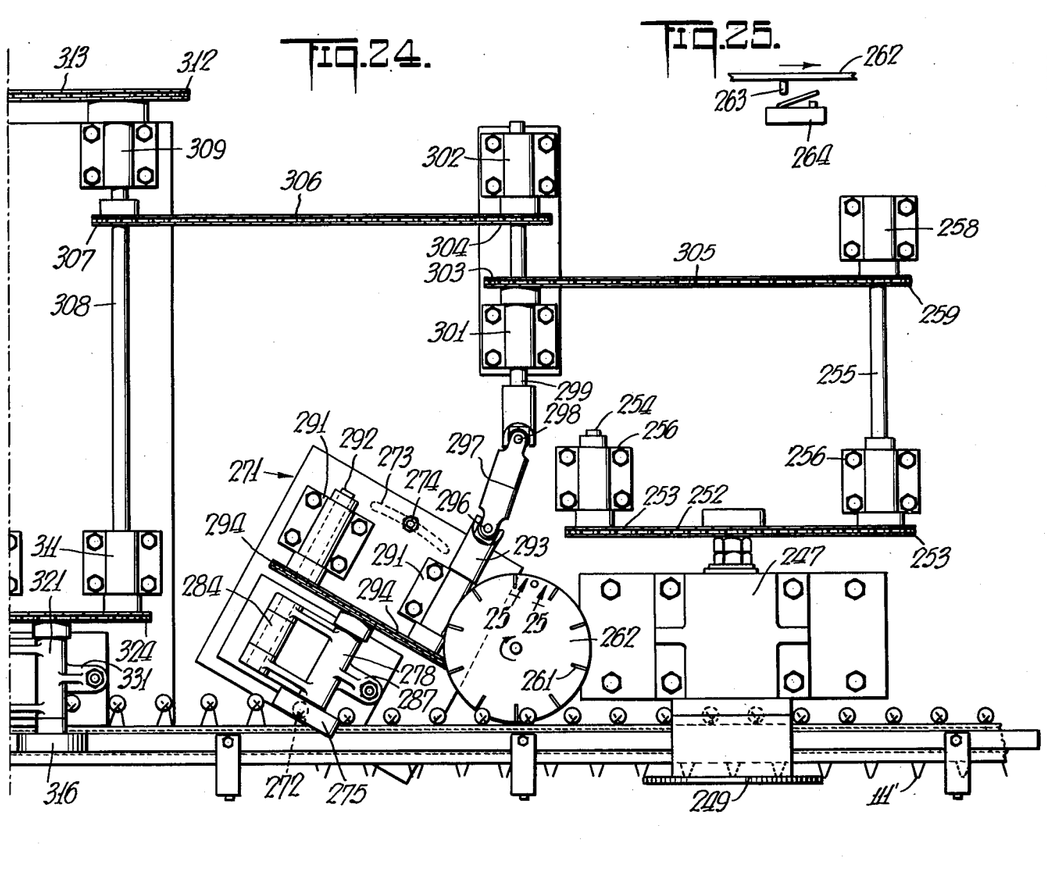
FIG. 24 is a top plan view of one portion of the mechanism of FIGS. 22 and 23.
FIG. 25 is a detail side elevational view taken along line 25—25 of FIG. 24.

As shown in FIGS. 22, 23 and 24, the severing means comprises a standard 247 affixed on table 23'', and having a bearing at its upper end through which a shaft 248 extends. Affixed to shaft 248 at one end is a cutting wheel 249 which coacts with a second cutting wheel 251 similarly mounted on a second shaft 248 on standard 247, so that as the cutting wheels rotate, the reversely bent loop 111' passing therebetween will be severed. To rotate the cutting wheels in opposite directions, a sprocket wheel 252 is affixed to the end of each of the shafts 248 of the cutting wheels 249 and 251. A pair of idler sprocket wheels 253 are affixed to the ends of associated shafts 254, 255 supported in standards 256 affixed to the table 23" and a sprocket chain 257 passes around the idler sprocket wheels 253 and over the sprocket wheels 252. The free end of shaft 255 is supported in a bearing 258 and mounts a sprocket wheel 259 which is rotated in the manner to be described to rotate the cutting wheels 249, 151.

In order that the tape may be cut in predetermined lengths, a tape severing mechanism 268 hereinafter to be described, is provided. To actuate the tape severing mechanism 268, in the illustrative embodiment herein, after the reversely bent loop 111' has been severed, with continued advance of the tape, the capacitor disks thereon will successively engage a plurality of upstanding fingers 261 illustratively mounted on a rotatable timing disk 262 (FIG. 24). The timing disk illustratively has ten fingers and is arranged so that with the passage of ten disks, the timing wheel will rotate one complete revolution and an actuating finger 263 thereon (FIG. 25) will engage a micro-switch 264 to close the circuit to said tape severing mechanism 268 to form predetermined lengths of tape, each illustratively having ten capacitor units thereon.

After the timing disc 262, means are provided to move the capacitor discs and the leads slightly outward away from the tape so that the leads 145, 146 adjacent the capacitor disc 147 will be readily accessible for testing apparatus to be applied thereto.

In the illustrative embodiment herein shown (FIGS. 22, 24) such mechanism desirably comprises a substantially rectangular plate 271 which rests on the table 23" and is pivotally mounted as at 272. Adjacent the edge of the plate, an arcuate slot 273 is provided through which a screw 274 extends that is threaded into the table. Thus the position of the plate with respect to the path of movement of the tape may be adjusted. Mounted on the plate in superposed relationship are a pair of pulling rollers 275 and 276. These rollers are designed to straddle the capacitor discs as they are advanced by the tape and as illustratively shown, are at an acute angle with respect to the tape so that when the rollers are rotated in opposite direction, the capacitor discs therebetween will be moved outwardly drawing the terminal leads thereof slightly from the tape.

The rollers are mounted on associated shafts 277 rotatably mounted in suitable bearings 278 and 279, each of the shafts having a sprocket wheel 281 and 282 at its end. The bearing 279 is formed at the upper end of a standard 283 mounted on plate 271 and the bearing 278 is pivotally mounted as at 284 at the upper end of a standard 286 also mounted on plate 271. The bearing 278 has a finger 287 extending laterally therefrom, through which extends the upper end of a post 288 affixed at its lower end in plate 271. Thus by adjusting a nut 289 threaded on post 288, the gripping tension of the rollers 275, 276 may be adjusted.

Mounted on the plate 271 are a pair of standards 291 which have bearings at their upper ends through which extend shafts 292 and 293, each of which mounts a sprocket wheel 294 at one end. A sprocket chain 295 passes around the sprocket wheels 281, 282 and 294, in such manner that when the shaft 293 is rotated the rollers 275 and 276 will rotate in opposite directions to draw the capacitor disc and associated leads from the tape. To rotate the shaft 293 a universal joint 296 is provided connected by link 297 to a universal joint 298 at the end of a drive shaft 299. Shaft 299 is supported in bearings 301 and 302 mounted on standards affixed to the table 23". The portion of shaft 299 between bearings 301 and 302 mounts a pair of sprocket wheels 303 and 304, the former being connected by sprocket chain 305 to sprocket wheel 259 on shaft 255 and the latter being connected by sprocket chain 306 to sprocket wheel 307 on a shaft 308. The shaft 308 is rotatably mounted in bearings 309, 311 at the upper end of standards affixed to the table 23" and extends at right angles to the path of movement of the tape. One end of the shaft 308 adjacent bearing 309 mounts a sprocket wheel 312 which is connected by sprocket chain 313 to a sprocket wheel 314 on the drive shaft of the drive motor M' (FIG. 26).

The shaft 308 serves to drive a pair of rollers 316 and 317 (FIGS. 23 and 24) which are positioned on opposed sides of the tape and engage the latter to advance such tape through the various stages of operation previously described. The rollers 316 and 317 are mounted on associated shafts 318 and 319 which rotate in suitable superposed bearings 321 supported on the table 23". Each of the shafts 318 and 319 mounts a sprocket wheel 322 at its free end and such sprocket wheels 322 are connected by a sprocket chain 323 to a sprocket wheel 324 on the end of shaft 308 adjacent bearing 311 and to a sprocket wheel 325 at the end of a shaft 326 mounted in a standard 327 affixed to the table 23". The linkage of such sprocket wheels is such that the rollers 316 and 317 will rotate in opposite directions to advance the tape.

In order that the tension of the rollers 316, 317 against the tape can be adjusted, the upper bearing 321 carrying shaft 318 is pivotally mounted as at 328 on a standard 329 and a finger 331 rigid with said upper bearing has an opening through which the upper end of a post 332 extends. Thus by adjusting a nut 333 screwed on post 332, the tension of the rollers can be adjusted.

Figures 26, 27, 28:
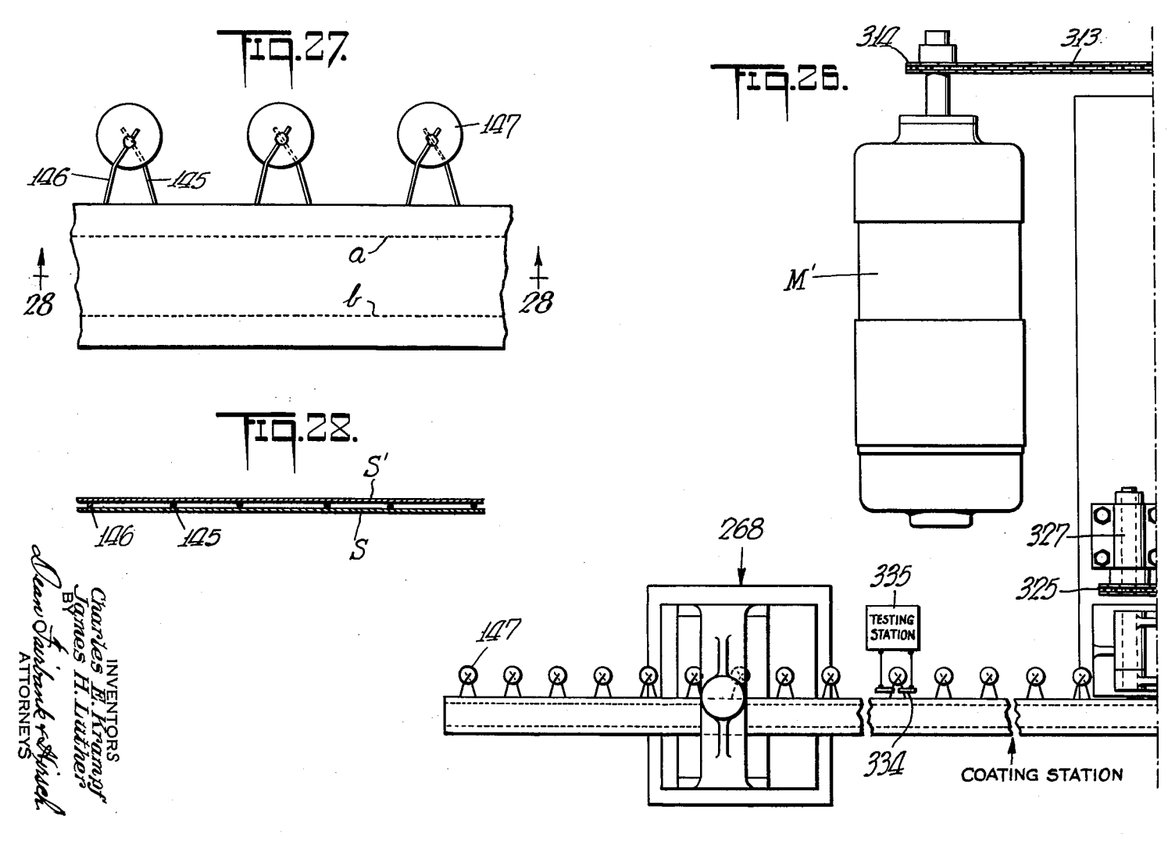
FIG. 26 is a top plan view of another portion of the mechanism of FIGS. 22 and 23.
FIG. 27 is a top plan view of the article formed by the equipment.
FIG. 28 is a longitudinal sectional view taken along line 28—28 of FIG. 27.

As the capacitor discs and the associated leads extend substantially from the adjacent longitudinal edge of the tape as is clearly shown in FIG. 26, the pair of leads of the capacitors are readily and successively accessible by suitable testing mechanism. Such test equipment may comprise a pair of fingers 334 which are engaged by each pair of leads and are connected to a suitable test instrument 335 which may be of the type, for example, for determining the breakdown voltage that may be applied to the capacitor. The tape then passes through the cutting mechanism 268 which will sever the tape in predetermined lengths under control of the timing disc 262 previously described.

The cutting mechanism may comprise a pair of blades 337 and 338 (FIG. 23), the former being fixed and the latter being movable, and controlled by a solenoid 339 energized by the closing of microswitch 264 associated with timing disc 262 to sever the tape between adjacent discs 147.

The semi-completed units are finished generally by dipping into a molten plastic which forms a moisture proof insulating coating over the capacitor disc. Such coating may be applied by passing the discs into a tank similar to the solder and flux tanks 225, 226 previously described and positioned, for example, in the line between the drive rollers 316, 317 and the testing station as indicated in FIG. 26, or after the tape is severed into predetermined lengths, they may be dipped in batches into a suitable coating tank.

As the mechanism to effect the coating in conjunction with the assembly line is similar to the mechanism for dipping the discs into the flux and solder tanks, it will not be described.

*Operation*

To ready the equipment for operation, a pair of strips S and S' are drawn from the supply rollers (not shown) and passed around the rollers 68, 69 (FIG. 8). The strips are then passed along the guides 78 and 73 respectively and positioned between the presser foot 66 and the presser plate 67 of the sewing machine. The strips are thereafter positioned beneath the belt 126; between the guide strips 134, 135 shown in FIG. 9 and between roller 221 and the associated guide strip 135 and then passed around the roller 228 (FIG. 16), guide strip 234, rollers 229 and 236 and between the pair of guide strips 238 and the guide strips 241, 242 (FIG. 18). The strips are thereupon positioned between the tape advancing rollers 316, 317 and between the cutting blades 337, 338 of the cutting mechanism 268 shown in FIG. 23.

The hopper sleeve 196 (FIG. 14) is charged with capacitor discs of the type previously described and a length of wire from the supply spool is passed around the rollers 90', 91 (FIG. 7), through the bore 90 of guide 88 (FIG. 19), through the sleeve 89 and then connected at its free end to one of the depending pins 45.

The drive motors M and M' are then energized and the equipment will assemble the capacitors in the following manner.

The drive motor M (FIG. 2) will, through pulley 51, belt 52, pulley 53 (FIG. 1), shaft 54, pulley 56 and belt 57 drive the pulley 58 of the sewing machine. The drive motor M (FIG. 2) will also, through shaft 47 and sprocket wheels 48 and 49, drive the shaft 52 to rotate the pair of sprocket chains 39 and 41 in a clockwise direction from the position shown in FIG. 8.

As the sprocket chains move, the pins 45 thereof will successively engage alternate microswitches 104, 105 (FIG. 1) to cause air under pressure to be alternately applied to the ports 86, 87 of the cylinder 83 shown in FIG. 19. Referring to FIG. 19, it is clearly seen that as the sleeve 89 carried by shaft 81, which is reciprocated by the air cylinder 83, is moved back and forth and as the sprocket chains 39 and 41 are advanced, the length of wire will be wound around the depending pins 45 on the sprocket chains alternatively for the desired substantially sinusoidal conformation.

Referring to FIG. 8, the sinusoidal conformation of the wire will be laid between the two spaced strips S and S', and the needles of the sewing machine, which are reciprocated in conventional manner, will form two lines of stitching a and b securely to retain the sinusoidal loops of wire between the connected strips S and S' which now define a tape.

As the tape, with the wire affixed thereto, is advanced by the sprocket chains it will move beneath the belt 126 (FIG. 8) and as the belt is downwardly inclined and the adjacent portions of the sprocket chains move in a horizontal plane, the pins 45 carried by the sprocket chains will be withdrawn from the reversely bent loops 111 and 111' so that when the tape with the wire affixed thereto reaches the roller 119 (FIG. 9) the pins will be completely clear of the ends of the wire loops.

Figure 13:
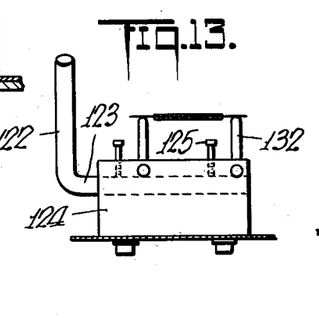
FIG. 13 is a transverse sectional view taken along line 13—13 of FIG. 9.

Inasmuch as the loops 111, 111', which protrude laterally beyond the longitudinal edges of the tape, may be bent slightly out of their plane by reason of the withdrawal of the pins therefrom, when such protruding loops 111 and 111' ride over the arms 133 shown in FIGS. 9 and 13, such loops will be straightened out and returned to substantially the same horizontal plane as the tape.

Further advance of the tape will move the reversely bent loop 111 between the cutting wheels 137, 138 (FIGS. 2 and 9) and as such cutting wheels are rotated through the drive from motor M by the transmission from shaft 47 through sprocket wheel 140, chain 144, sprocket wheel 143', the wire loops 111 will be severed to form the two leads 145 and 146.

Referring to FIGS. 2, 3 and 4, as the tape with the severed loops thereon is advanced, the leads 145, 146 will pass beneath the inclined strip 152 so that the leads will be placed under a slight tension. With further advance of the tape, the lead 146 will reach the end 153 of the strip and thereupon snap upwardly in the space between end 153 and the beveled edge 154 of the separator plate 155. The leading lead 146 will thereupon ride on top of said plate. The lead 145, when it reaches the end of the strip 152, will have its end 156 moved beneath the separator plate 154. Consequently, with further movement of the tape the lead 146 will be on top of the plate and the lead 145 will be beneath the plate.

When the tape advances sufficiently to bring the lead 145 in juxtaposition to the star wheel which is rotating in a clockwise direction at a speed greater than the rate of advance of the tape, one of the teeth of the star wheel will engage and bend such lead 145 to the left. The star wheel is rotated through the drive including pulley 169, belt 171, pulleys 172, 173, shaft 175, sprocket wheel 177, sprocket chain 178 and sprocket wheel 143' which is driven by the main drive motor M. Thus the teeth of the star wheel will bend to the left successive leads 145. With further advance of the tape, the lead 146 will abut against the arm 181 to be moved to the right so that it crosses over the end of lead 145.

Continued advance of the tape will bring the crossed over leads 145 and 146 to the disc insertion unit shown in FIG. 10.

As the crossed leads 145 and 146 approach the disc insertion unit, the top lead 146 will ride up the inclined strip 216 (FIGS. 5, 6) so that when the leads 145 and 146 are aligned with the notches 183 and 185 (FIG. 10) of the disc inserter, the lead 146 will be spaced sufficiently from the separator plate 155 so that a disc may be inserted beneath said lead 146. The disc is inserted by means of the actuation of the pusher strip 189. This is accomplished from the pulley 173 (FIG. 2) whose fingers 213 will engage the inclined plate 214 and pivot the free end 212 of lever 203 in a counterclockwise direction from the position shown in FIG. 2, thereby moving the pusher rod 201 to move the pusher bar 187 forwardly. Such movement of the pusher bar will cause the pusher strip 189 to force the bottommost disc in the sleeve 196 forwardly beneath the lead 146 and over the lead 145 beneath the separator plate.

With further advance of the tape, the top lead 146 will move clear of the strip 216 and press against the top of the disc and the bottom lead 145 will move clear of the separator plate 155 and press against the bottom of the disc. By reason of the crossed leads 145 and 146, a three-point suspension will be provided for the disc, i.e., by each of the leads and at the region of cross over, which will securely retain the disc in position for further advance with the tape.

After the disc has been inserted in the manner above described, the tape, which is retained against the bottom strip 135 by roller 221 (FIG. 9), will advance to the dipping station shown in FIG. 16. As the tape passes around the rollers 228, 229 and 236, and is twisted to substantially vertical position, as shown in FIG. 17, the lower edge of the disc and the ends 156 and 156' of the leads (FIG. 3) will be first dipped into the flux tank 225 and thereupon will be dipped into the solder tank 229, securely to affix the leads to the silver coated faces of the disc. Thereupon, the tape will advance from the solder tank and as it passes between the guide strips 241, 242, will be retained in proper position as such guide strips fit between the lines of stitching a and b.

As the tape continues to advance, the reversely bent loops 111' will pass between the cutting wheels 249 and 251 shown in FIGS. 22 and 24 and such reversely bent loops will be severed. The cutting wheels are driven through the transmission including sprocket wheels 252, sprocket chain 257, sprocket wheels 253, shaft 255, sprocket wheel 259, sprocket chain 305, sprocket wheels 303 and 304, sprocket chain 306, sprocket wheel 307, shaft 308, sprocket wheel 312, sprocket chain 313, and sprocket wheel 314 on the shaft of motor M'.

The discs, after the reversely bent loops 111' have been severed, as above described, will thereupon advance and abut against the upstanding fingers 261 on timer disc 262 (FIGS. 24 and 25). The timer disc in the illustrative embodiment is designed to close a circuit to the cutting mechanism after each ten discs have passed and when this occurs the pin 263 on the timer disc will actuate microswitch 264 to energize the cutting mechanism solenoid 339 (FIG. 23).

Further advance of the tape beyond the timing disc will bring the discs to the lead withdrawal unit shown in FIGS. 22 and 24.

As the rollers 275 and 276 of the lead withdrawal unit are at an angle with respect to the tape and are rotating in a clockwise and counterclockwise direction respectively, the discs will be moved thereby laterally outward from the tape to a predetermined extent. The rollers are driven through the transmission including the sprocket wheels 281, 282, 294, shafts 293 and 299 which latter is rotated in the manner previously described from the drive motor M'.

After the discs have been moved laterally from the tape, as previously described, they may be passed through a suitable coating station as indicated in FIG. 26 which may comprise a tank filled with any suitable insulating material and associated rollers similar to those of the flux and solder tanks 225 and 226.

After such withdrawal operation, regardless if the coating is performed at the position indicated in FIG. 26, or if it is not coated at such position, the further movement of the tape will advance the disc thereon to a testing station indicated at 335 where contacts 334 will engage the leads 145 and 146 of the condenser unit and test, say, the break-down voltage of the unit. If the unit is below the desired rating, the tape may be stopped at such point or a suitable mechanism (not shown) may pull the defective disc from the tape leaving a blank space. After the testing operation, further advance of the tape will bring the discs to and through the severing unit indicated at 268. After a predetermined number of discs have passed through the unit, determined by the timer disc 262 shown in FIG. 24, the micro-switch 264 (FIG. 25) will be actuated to energize the solenoid 339, causing the movable blade 338 (FIG. 23) to move downwardly to sever the tape between adjacent discs.

As a result of the above operation, a strip will be formed as shown in FIGS. 27 and 28, which comprises a predetermined number of completed capacitor units. In the illustration shown in FIGS. 27, 28, the capacitor units have not yet been coated and in such case the plurality of lengths of tape with the discs thereon may be taken to a dipping unit and dipped in a batch to provide the desired coating.

With the equipment above described, disc type capacitors may be fabricated at high speed and with a minimum of supervision with resultant low cost per unit. As the units are removably mounted on a tape they may readily be removed therefrom either manually or by suitable automatic equipment.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patents of the United States is:

1. Equipment of the character described comprising means to advance a tape, comprising a pair of superposed strips, means while said tape is advancing to affix a plurality of pairs of wire leads to said tape between said strips distributed along the length thereof, said leads extending beyond one of the longitudinal edges of said tape, means in the path of movement of said leads to insert an electrical unit for electrical connection between the ends of each of said pairs of leads and means in the path of movement of the ends of said leads to connect said leads to said electrical unit.

2. Equipment of the character described comprising means to advance a tape, comprising a pair of superposed strips, means while said tape is advancing to affix a continuous length of wire to said tape between said strips to extend beyond at least one of the longitudinal edges thereof in successive loops along the length of the tape, means in the path of movement of the ends of said loops to sever the latter to form pairs of leads, means to insert an electrical unit for electrical connection between the ends of each of said pairs of leads, and means to connect said leads to the electrical unit.

3. Equipment of the character described comprising means to advance a tape, comprising a pair of superposed strips, means while said tape is advancing to affix a continuous length of wire to said tape between said strips to extend beyond at least one of the longitudinal edges thereof in successive loops along the length of the tape, means in the path of movement of the ends of said loops to sever the latter to form pairs of leads lying in substantially the same plane of said tape, means in the path of movement of said leads to effect relative movement of at least one of said leads in direction at right angles to the plane of the tape to space the free ends of said leads, means reacting against said leads to cross said leads near their free ends, a hopper for wafers of insulating material having a conductive coating on opposed surfaces thereof, means to advance wafers from said hopper between the spaced crossed over portions of successive pairs of leads and means to affix the ends of said leads to the conductive coatings on the opposed surfaces of the wafer.

4. The combination set forth in claim 3 in which the means to space said leads comprises a separator plate lying in a plane substantially parallel to the plane of said tape and means are provided to deflect one of said leads below said plate and to effect movement of the other of said leads above said plate.

5. The combination set forth in claim 3 in which the means to cross said leads comprises a movable finger adapted to engage the trailing lead of successive pairs of leads to bend the latter in direction of movement of the tape and a fixed member against which the leading lead of successive pairs of leads is designed to abut to bend the latter in direction opposed to the direction of movement of the tape.

6. The combination set forth in claim 3 in which said leads are inclined toward each other and the means to space said leads comprises a separator plate lying in a plane substantially parallel to the plane of said tape, said plate having a transverse edge beveled at an angle substantially the same as the angle of the leading lead of said pair, and an inclined deflector arm is provided extending longitudinally of said tape and beneath which said leads are adapted to pass, the free end of said arm being positioned closely adjacent said transverse edge, whereby when said leading lead is advanced by the tape past the end of said arm, it will snap up in the space between the end of said arm and said beveled edge to a position above the level of said separator plate, and when the trailing lead is advanced by the tape, the free end thereof will be moved beneath said separator plate thereby spacing said leads.

7. The combination set forth in claim 6 in which the means to cross said leads comprises a wheel rotatable in direction of movement of said tape and having a plurality of radiating fingers, at least one of said fingers being adapted to engage the trailing lead positioned beneath said separator plate, and a fixed member against which the lead above said separator plate is designed to abut.

8. Equipment of the character described comprising means to advance a pair of superimposed strips, means while said strips are advancing to position a continuous length of wire between said strips so as to extend beyond at least one of the longitudinal edges thereof in successive loops along the length of the strips, means to connect said advancing strips together to retain said wire therebetween, said superposed strips defining a tape, means in the path of movement of the ends of the loops to sever the latter to form pairs of leads, means to insert an electrical unit for electrical connection between the ends of each of said pairs of leads and means to connect said leads to the electrical unit.

9. The combination set forth in claim 8 in which the means to connect said strips together comprises a stitching machine coacting with said superposed strips to connect the latter along a line extending substantially parallel to the longitudinal edges thereof.

10. The combination set forth in claim 8 in which the means to connect said strips together comprises a sewing machine coacting with said superposed strips to connect the latter along a line extending substantially parallel to the longitudinal edges thereof.

11. The combination set forth in claim 8 in which the means to connect said strips together comprises a sewing machine having a pair of needles transversely aligned with respect to the strips and adapted to form two spaced lines of stitching extending parallel to the longitudinal edges of the strips.

12. Equipment of the character described comprising means to advance a pair of superimposed strips, means while said strips are advancing to position a continuous length of wire between said strips so as to extend beyond at least one of the longitudinal edges thereof in successive loops along the length of the strips, means to connect said advancing strips together to retain said wire therebetween, said superimposted strips defining a tape, means in the path of movement of the ends of said loops to sever the latter to form pairs of leads, means reacting against said leads to cross over each of said pairs of leads near their free ends, means to space the leads of each pair adjacent said crossed over portions, a hopper for wafers of insulating material having a conductive coating on each of the opposed surfaces thereof, means to advance wafers from said hopper between the spaced crossed over portions of successive pairs of leads and means to affix the ends of said leads to the conductive coatings on the opposed surfaces of the wafer.

13. The combination set forth in claim 12 in which cutting means are positioned in the path of movement of said tape to sever the latter into predetermined lengths.

14. The combination set forth in claim 13 in which said cutting means comprises a fixed blade and a movable blade spaced therefrom, said tape moving between said blades and means to actuate said movable blade.

15. The combination set forth in claim 12 in which cutting means are positioned in the path of movement of said tape, said cutting means comprising a fixed blade and a movable blade spaced therefrom, said tape moving between said blades, actuating means operatively connected to said movable blade to effect the cutting action and a timer member controlled by the movement of the wafers by said tape to effect operation of said actuating means.

16. The combination set forth in claim 12 in which means are provided to effect movement of said wafers slightly outward from said tape.

17. Equipment of the character described comprising means to advance a pair of superposed strips, means while said strips are advancing to position a continuous length of wire between said strips so as to extend beyond the longitudinal edges thereof in successive loops along the length of the strips, means to connect said strips together to retain said wire therebetween, said superposed strips defining a tape, means in the path of movement of the ends of said loops to sever said loops extending beyond one of the longitudinal edges of said tape to form pairs of leads, means reacting against said leads to cross over each of said pairs of leads near their free ends, means to space the leads of each pair adjacent said crossed over portions, a hopper for wafers of insulating material having a conductive coating on each of the opposed surfaces thereof, means to advance wafers from said hopper between the spaced crossed over portions of successive pairs of leads, means to affix the ends of said leads to the conductive coatings on the opposed surfaces of said wafers, and means to sever the reversely bent loops extending beyond the other longitudinal edge of the tape.

18. The combination set forth in claim 17 in which the means to affix the ends of the leads to the conductive coatings on the opposed surfaces of the wafers comprises a solder tank, and means to position said wafers substantially vertically in said tank to immerse the ends of said leads in engagement with said wafer in said solder.

19. The combination set forth in claim 17 in which means are provided to effect movement of the wafers slightly outward from said tape.

20. Equipment of the character described comprising means to advance a length of tape, comprising a pair of superposed strips, a plurality of spaced wire mounting pins on each side of the tape, means to advance said wire mounting pins, means to weave a length of wire around the pins in substantially a sinusoidal pattern to form loops along the length of the tape, between the strips, extending laterally beyond the longitudinal edges thereof, means to affix said wire to said tape, means to sever the loops extending beyond at least one of the longitudinal edges of the tape to form pairs of leads, means to insert an electrical unit for electrical connection between the ends of the leads and means to connect said leads to the electrical unit for such purpose.

21. The combination set forth in claim 20 in which means are provided to strip the loops from the pins after the wire is affixed to the tape and prior to severing such loops.

22. The combination set forth in claim 20 in which the means to advance said wire mounting pins comprises a pair of spaced carriers each supporting a plurality of said pins distributed along the length thereof and which depend from the associated carrier and are positioned inwardly thereof, and the means to weave the wire around the pins comprises a guide member through which the wire extends, said guide member being mounted for movement in a plane parallel to the path of movement of the carriers and transversely therebetween, said guide member in each of its extreme positions being located between the associated carrier and the line of pins carried thereby, means to reciprocate said guide member in timed relation to the movement of said carriers so that as a pin on one of the carriers moves by said guide member, the guide member will be moved to the other carrier, whereby the pins will abut against the wire which will be woven around said pins.

23. The combination set forth in claim 22 in which the guide member is movable between the strips of said tape transversely with respect to the path of movement thereof and means are provided to connect said strips together after such wire has been woven around the pins on said carriers.

References Cited in the file of this patent
UNITED STATES PATENTS

| | | |
|---|---|---|
| 1,740,177 | Horton et al. | Dec. 17, 1929 |
| 1,757,692 | Vawter | May 6, 1930 |
| 2,214,230 | Freeburg | Sept. 10, 1940 |
| 2,251,609 | Freeburg | Aug. 5, 1941 |
| 2,352,651 | Meston | July 4, 1944 |
| 2,766,510 | Heibel | Oct. 16, 1956 |